(12) United States Patent
Minotani et al.

(10) Patent No.: US 7,801,483 B2
(45) Date of Patent: Sep. 21, 2010

(54) RECEIVER, TRANSCEIVER, AND ELECTRIC FIELD COMMUNICATION SYSTEM

(75) Inventors: Tadashi Minotani, Kanagawa-ken (JP); Mitsuru Shinagawa, Kanagawa-ken (JP)

(73) Assignee: Nippon Telegraph and Telephone Corporation (JP)

( * ) Notice: Subject to any disclaimer, the term of this patent is extended or adjusted under 35 U.S.C. 154(b) by 222 days.

(21) Appl. No.: 11/814,865

(22) PCT Filed: Jan. 24, 2007

(86) PCT No.: PCT/JP2007/051082
§ 371 (c)(1), (2), (4) Date: Jul. 26, 2007

(87) PCT Pub. No.: WO2007/086422
PCT Pub. Date: Aug. 2, 2007

(65) Prior Publication Data
US 2009/0023387 A1      Jan. 22, 2009

(30) Foreign Application Priority Data
Jan. 25, 2006   (JP) .............................. 2006-016343

(51) Int. Cl.
*H04B 5/00* (2006.01)
(52) U.S. Cl. ...................... 455/41.1; 455/78; 455/575.6; 455/276.1; 455/422.1; 455/100; 375/219; 375/220; 331/56; 331/107; 331/114
(58) Field of Classification Search ................ 455/41.1, 455/117, 276.1, 575.6, 422.1, 78, 100, 73, 455/125; 375/219, 220; 331/114, 107, 56
See application file for complete search history.

(56) References Cited

U.S. PATENT DOCUMENTS
5,859,572 A * 1/1999 Hill .............................. 331/56

(Continued)

FOREIGN PATENT DOCUMENTS
JP      2004-153708      5/2004

(Continued)

*Primary Examiner*—Edward Urban
*Assistant Examiner*—Ganiyu Hanidu
(74) *Attorney, Agent, or Firm*—Kilpatrick Stockton LLP (57) ABSTRACT

A transmitter (2) modulates information to be transmitted with an alternating-current signal having a predetermined frequency and includes a variable reactance section (16) which produces resonance with a stray capacitance (18) between a circuit ground (17) in the transmitter (2) and an earth ground (20) which strays from the earth ground (20) and a stray capacitance (19) between the human body (3) and the earth ground (20). A receiver (1) that receives the induced electric field from the transmitter (2) includes an electrode (12) that transmits/receives the electric field to/from the human body (3); a detection signal source (10) that applies a detection signal to the electrode (12); and a detecting section (9) which detects the detection signal, and further detects, based on an amplitude of the detection signal, a resonant state of the variable reactance section (16) in the transmitter (2) held by the human body (3) close to the electrode (12), the stray capacitance (19) between the human body (3) and the earth ground (20), and the stray capacitance (18) between the ground (17) of the transmitter (2) and the earth ground (20), and outputs a signal when the resonant state is present.

22 Claims, 10 Drawing Sheets

U.S. PATENT DOCUMENTS

| | | |
|---|---|---|
| 6,211,799 B1 * | 4/2001 | Post et al. ............... 341/33 |
| 6,223,018 B1 * | 4/2001 | Fukumoto et al. ......... 455/41.1 |
| 7,069,062 B2 * | 6/2006 | Minotani et al. ......... 455/575.6 |
| 7,583,930 B2 * | 9/2009 | Minotani et al. ......... 455/41.1 |
| 2003/0060162 A1 * | 3/2003 | Shinagawa et al. ......... 455/41 |
| 2004/0092296 A1 * | 5/2004 | Minotani et al. ......... 455/575.6 |
| 2005/0003811 A1 * | 1/2005 | Hale et al. ............. 455/422.1 |
| 2006/0052074 A1 * | 3/2006 | Minotani et al. ......... 455/276.1 |

FOREIGN PATENT DOCUMENTS

| | | |
|---|---|---|
| JP | 2005-020293 A | 1/2005 |
| JP | 2005-020297 | 1/2005 |
| JP | 2007-020124 A | 1/2007 |
| KR | 10-2004-0094845 | 11/2004 |
| WO | 03/083507 | 10/2003 |

\* cited by examiner

RECEIVER, TRANSCEIVER, AND ELECTRIC FIELD COMMUNICATION SYSTEM

CROSS REFERENCE TO RELATED APPLICATIONS

This application is the U.S. National Phase of PCT/JP2007/051082 filed on 24 Jan. 2007 which claims the benefit Japanese Application No. JP2006-016343 filed on 25 Jan. 2006, the contents of which are incorporated by reference herein.

TECHNICAL FIELD

The present invention relates to a receiver, a transceiver, and an electric field communication system which are used in communication of performing transmission/reception of information by inducing an electric field in an electric field transmission medium and detecting this induced electric field.

BACKGROUND ART

With realization of miniaturization and high performance of a portable terminal, a wearable computer that can be attached to a human body has drawn attention. As information communication between such wearable computers, there has heretofore been proposed a method of connecting and attaching an electric field communication transceiver to a computer, and transmitting an electric field induced by this electric field communication transceiver through a human body as an electric field transmission medium to transmit/receive information.

Figure 1:
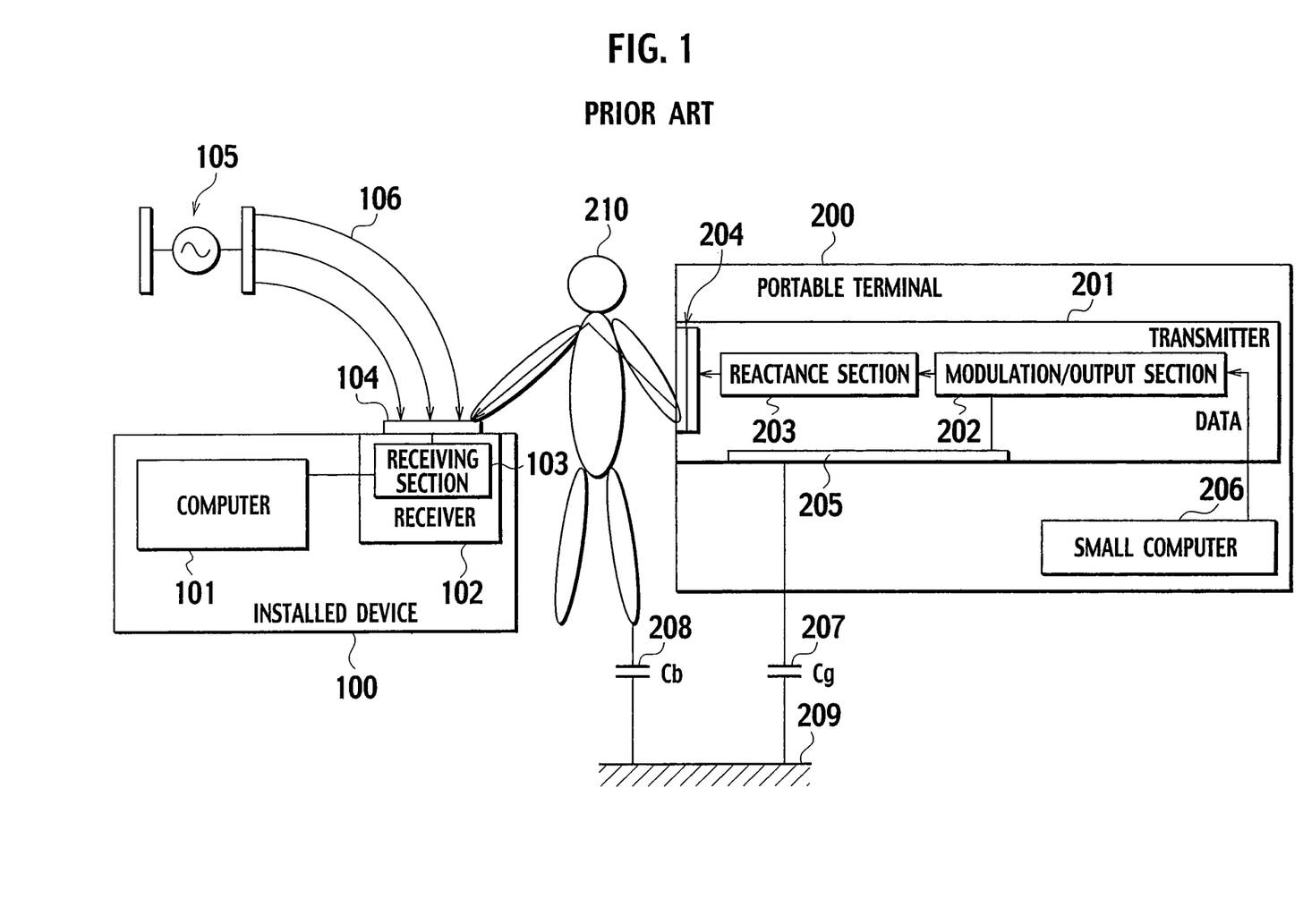
FIG. 1 shows an explanatory drawing for explaining an electric field communication system according to a conventional technology.

FIG. 1 shows an electric field communication system according to a conventional technology.

A transmitter 201 in a portable terminal 200 modulates and outputs, based on a carrier wave having a predetermined frequency f, information (data) to be transmitted that is output from a small computer 206. The transmitter 201 is distant from an earth ground 209, and a stray capacitance Cg 207 is produced between a circuit ground 205 and the earth ground 209. Further, a stray capacitance Cb 208 is produced between a human body 210 and the earth ground.

According to the conventional technology, a reactance section 203 is interposed between a transmission circuit (a modulation/output section 202) and a transmission/reception electrode 204, and a voltage signal applied to the human body 210 is increased based on a resonance phenomenon with the stray capacitance to realize electric field communication (e.g., see Japanese Patent Application Laid-open No. 2004-153708, United States Application Publication, Pub. No. US2004/009226A1 Pub. Date: May 13, 2004).

However, in an electric field communication system that induces an electric field in the human body 210 as a medium and detects the electric field from the human body 210 that is in contact with the transmission/reception electrode 104 to perform communication, an electric field signal emitted from another device 105 that is not in contact with a receiver (an installed type device 102) is also detected. FIG. 1 shows a schematic view of an electric field communication system exposed to a radiation signal (noise) 106 from the other device (a radiation source) 105. It is to be noted that the other device may be a transmitter included in another electric field communication system that is not intended to perform communication.

When the radiation signal 106 from the radiation source 105 is data that has the same frequency and is modulated in accordance with the same modulation mode as a signal from the transmitter 201, it is difficult for a receiver 103 and a computer 101 to determine whether the received data is data from the radiation source 105 or data from the receiver 201 on a reception side.

DISCLOSURE OF INVENTION

In view of the above problem, the present invention has been developed. It is an object of the present invention to provide a receiver, a transceiver, and an electric field communication system which are required for communication with high isolation that enables blocking data from a parasitic communication path.

To achieve the above object, an invention described in claim 1 is directed to a receiver that receives an induced electric field from a transmitter or a transceiver which modulates information to be transmitted with an alternating-current signal having a predetermined frequency and includes a variable reactance section that produces resonance with a stray capacitance between a circuit ground of the transmitter or the transceiver that strays from an earth ground and the earth ground and an impedance between an electric field transmission medium and the earth ground, in an electric field communication system that induces an electric field based on the information to be transmitted in the electric field transmission medium, and uses the induced electric field to transmit the information and that, on the other hand, receives the electric field induced in the electric field transmission medium based on the information to be received, thereby performing communication, the receiver comprising an electrode that transmits/receives the electric field to/from the electric field transmission medium; a detection signal source that applies a detection signal to the electrode; and a detecting section that detects the detection signal, further detects, based on an amplitude of the detection signal, a resonant state of the variable reactance section of the transmitter or the transceiver held by the electric field transmission medium near the electrode, an impedance between the electric field transmission medium and the earth ground, and the stray capacitance between the ground of the transmitter or the transceiver and the earth ground, and outputs a signal when the resonant state is present.

An invention described in claim 2 is directed to the receiver according to claim 1 which further comprises a demodulating section that demodulates a signal output from a filter section that reduces a signal having a frequency other than a predetermined frequency to output the information in a case where a signal is output from the detecting section, and stops processing in another case.

Furthermore, to achieve the above object, an invention described in claim 3 is directed to a receiver that receives an induced electric field from a transmitter or a transceiver which modulates information to be transmitted with an alternating-current signal having a predetermined frequency and includes a variable reactance section that produces resonance with a stray capacitance between a circuit ground of the transmitter or the transceiver that strays from an earth ground and the earth ground and an impedance between an electric field transmission medium and the earth ground, in an electric field communication system that induces an electric field based on the information to be transmitted in the electric field transmission medium, and uses the induced electric field to transmit the information and that, on the other hand, receives the electric field induced in the electric field transmission medium based on the information to be received, thereby performing communication, the receiver comprising an electrode that transmits/receives the electric field to/from the electric field transmission medium; a detection signal source that applies to the electrode a detection signal having a frequency different from that of an alternating-current signal from the transmitter or the transceiver; and a detecting section that detects the detection signal, further detects, based on an amplitude of the detection signal, a resonant state of the variable reactance section of the transmitter or the transceiver held by the electric field transmission medium near the electrode, an impedance between the electric field transmission medium and the earth ground, and the stray capacitance between the ground of the transmitter or the transceiver and the earth ground, and outputs a signal when the resonant state is present.

An invention described in claim 4 is directed to the receiver according to claim 3 which further comprises a demodulating section that demodulates a signal output from a filter section that reduces a signal having a frequency of an alternating-current signal from the transmitter or the transceiver to output the information in a case where a signal is output from the detecting section, and stops processing in another case.

An invention described in claim 5 is directed to the receiver according to claim 3 or 4 which further comprises between the electrode and the filter section a detection signal reducing reactance section that produces series resonance with the impedance between the electrode and the earth ground at a frequency of the detection signal output from the detection signal source, when the variable reactance section, the impedance between the electric field transmission medium and the earth ground, and the stray capacitance between the ground in the transmitter or the transceiver and the earth ground are in the resonant state.

An invention described in claim 6 is directed to the receiver according to any one of claims 1 to 5 which further comprises a first input reactance section that is used in a reception state where an electric field based on the information to be received is received; a second input reactance section that is used in a detection state where the resonant state is detected; and an input reactance switching section that switches the first input reactance section and the second input reactance section to be connected between the electrode and the ground of the receiver in accordance with a signal output from the detecting section.

An invention described in claim 7 is directed to the receiver according to any one of claims 2 and 4 to 6 which further comprises a gain varying/amplifying section that changes a gain in accordance with a signal output from the detecting section at a front stage of the filter section.

To achieve the above object, an invention described in claim 8 is directed to a transceiver which comprises a receiver according to any one of claims 1 to 7; a transmitter that transmits an electric field based on information to be transmitted to the electrode; and a transmission/reception switching section that switches the receiver and the transmitter to be connected with the electrode in accordance with a switching signal.

To achieve the above object, an invention described in claim 9 is directed to an electric field communication system that induces an electric field based on information to be transmitted in an electric field transmission medium, transmits the information by using the induced electric field and, on the other hand, receives an electric field induced in the electric field transmission medium based on the information to be received, thereby performing communication, the electric field communication system comprising a transmitter which includes a modulation/output section that modulates the information to be transmitted with an alternating-current signal having a predetermined frequency and outputs the modulated information; a transmission electrode that induces the electric field based on the information to be transmitted; and a variable reactance section that produces resonance with an impedance between the electric field transmission medium close to the transmission electrode and an earth ground and a stray capacitance between a ground of the modulation/output section and the earth ground when inducing the electric field, and does not produce the resonance when inducing no electric field; and a receiver according to any one of claims 1 to 7 or a transceiver according to claim 8.

An invention described in claim 10 is directed to the electric field communication system according to claim 9 wherein a reactance value of the variable reactance section varies depending on a case where the electric field is induced and a case where no electric field is induced.

BEST MODE FOR CARRYING OUT THE INVENTION

First Embodiment

Figure 2:
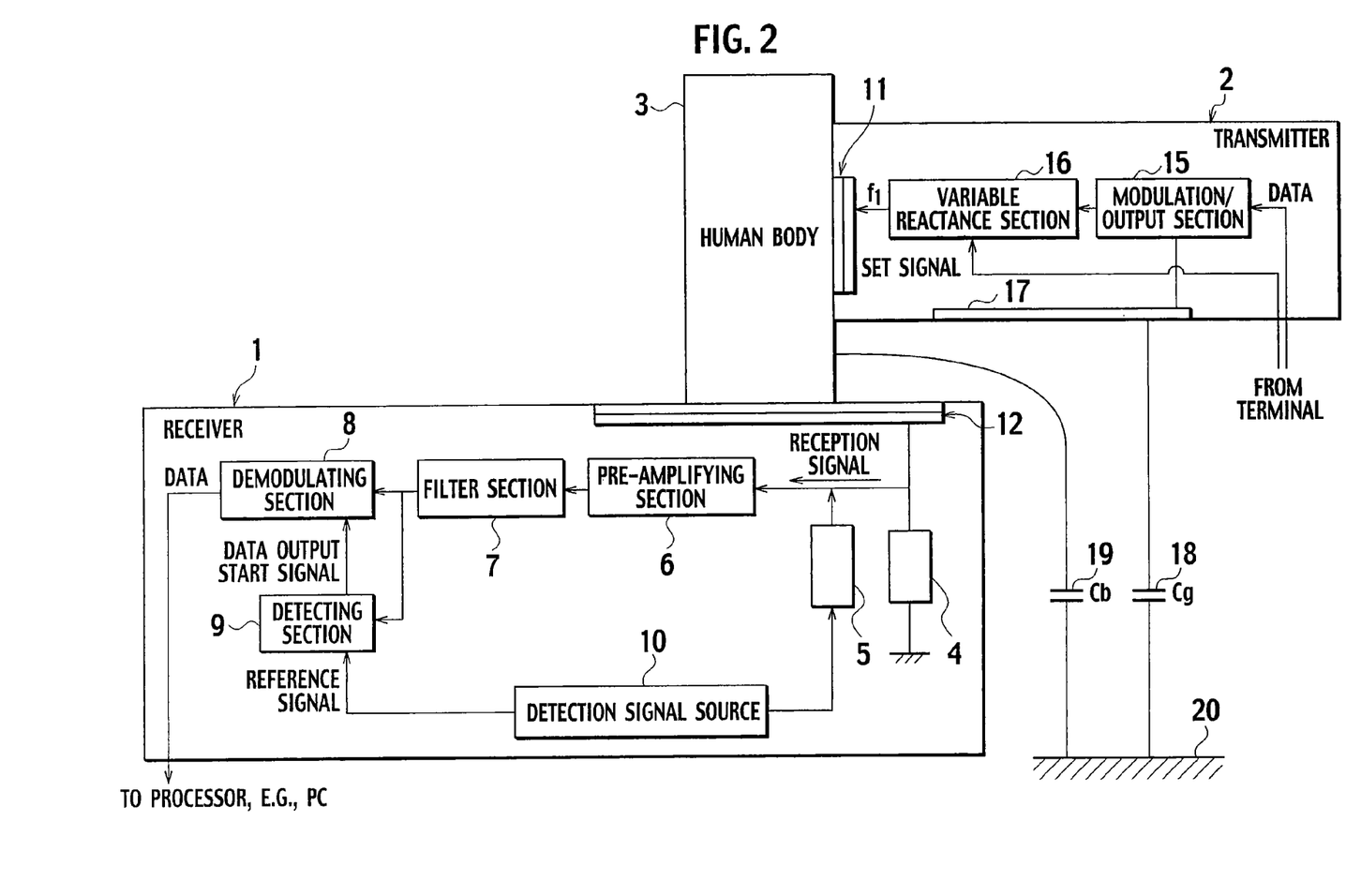
FIG. 2 shows a block diagram for explaining a basic structure according to a first embodiment.

FIG. 2 shows a block diagram of a first embodiment.

A transmitter 2 is in contact with a human body 3 which is an electric field transmission medium. This transmitter 2 modulates, with a signal having a predetermined frequency in a modulation/output section 15, data output from a terminal such as a computer that processes information, and then outputs the modulated data. In a variable reactance section 16, a reactance value is set in such a manner that a circuit constituted of, e.g., a stray capacitance Cg 18 between a circuit ground 17 and an earth ground 20, a stray capacitance Cb 19 between the human body 3 and the circuit ground 17, an input impedance of a receiver 1 and others becomes a resonant state with the predetermined frequency, whereby a signal is efficiently applied to the human body which is the electric field transmission medium.

The signal applied to the human body 3 is amplified in a pre-amplifying section 6 in a receiver 1 through a reception electrode 12. Then, unnecessary noise is removed by a filter section 7, and the signal is demodulated by a demodulating section 8 to restore the data. At the same time, a detection signal source 10 in the receiver 1 outputs a signal having the same frequency as that of a transmission side to an input reactance section 4 side through a detection signal source output impedance 5. This signal pursues the same path as that of the reception signal through the pre-amplifying section 6 and the filter section 7. A detecting section 9 detects the signal output from the filter section 7 to monitor that the human body 3 having the resonating transmitter 2 is in contact with the reception electrode 12.

Figure 3:
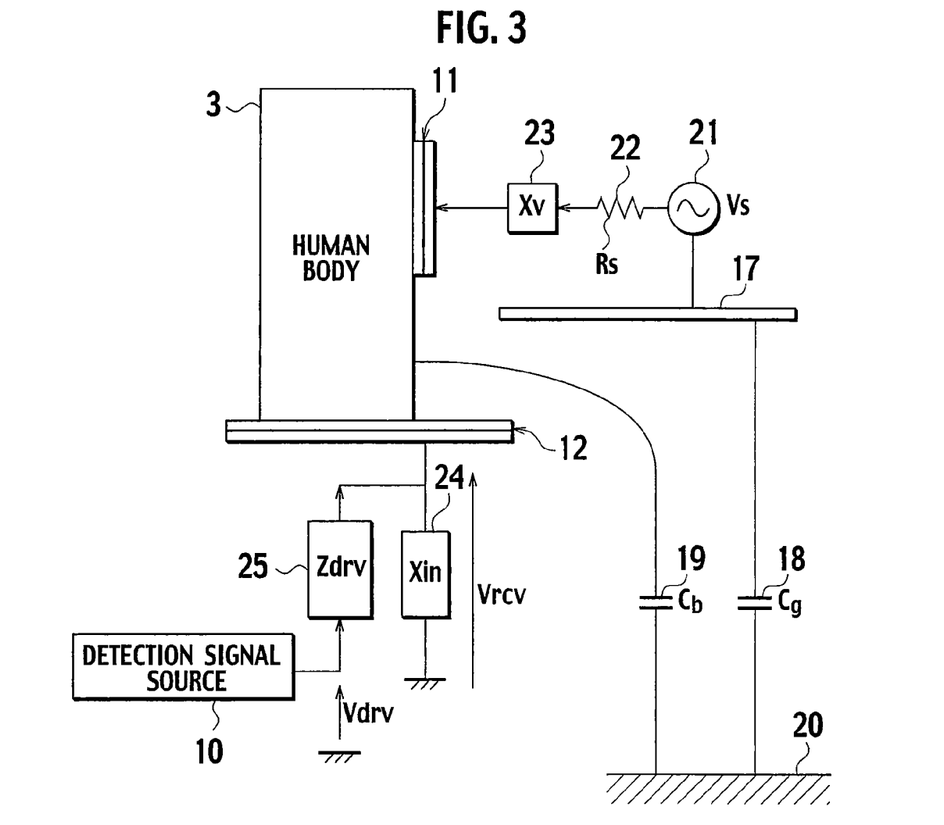
FIG. 3 shows an example of a circuit model in a communication system according to the first embodiment.
Figure 4:
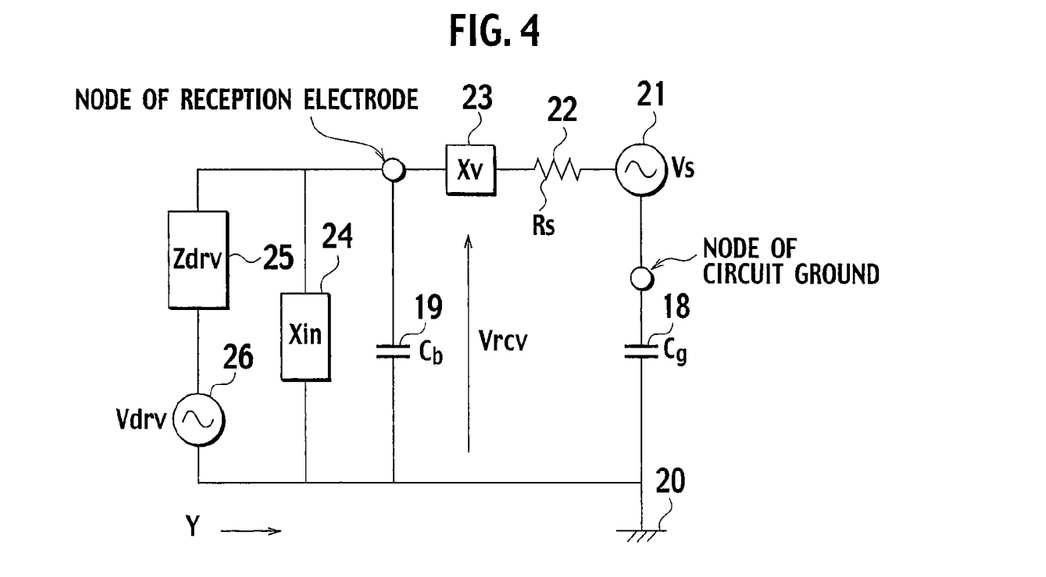
FIG. 4 shows an example of an equivalent circuit according to the first embodiment.

A principle of detecting the human body 3 having the transmitter 2 which produces the resonant state will now be explained by using a circuit model depicted in FIGS. 3 and 4. In this circuit model, a capacitance between the human body 3 and the electrode is ignored to simplify analysis. A voltage Vrcv,s from a signal source Vs 21 and a voltage Vrcv,d from a signal source Vdrv 26 are applied to the reception electrode 12.

First, the signal source Vdrv 26 is ignored, and Vrcv,s is analyzed. Vrcv,s is represented by the following expression by using a variable reactance Xv in the transmitting section, an input reactance Xin 24 in the receiving section, an output resistor Rs 22 in a signal source 21, and the stray capacitances Cb and Cg 18.

[Expression 1]

$$V_{rvc,s} = \cfrac{\cfrac{1}{j\omega C_b + 1/jX_{in}}}{R_s + jX_v + \cfrac{1}{jC_g} + \cfrac{1}{j\omega C_b + 1/jX_{in}}}$$

$$V_s = \cfrac{1}{1 + \cfrac{C_b}{C_g} - \omega C_b X_v + \cfrac{X_v}{X_{in}} + \cfrac{1}{\omega C_g X_{in}} + j\omega C_b R_s + \cfrac{R_s}{jX_{in}}} V_s$$

In this analysis, Zdrv 25 is ignored since it is sufficiently large. In Expression (1), the resonance occurs and Vrcv,s becomes maximum when the following Expression (2) is achieved.

[Expression 2]

$$X_v = \frac{1}{\omega C_g} + \frac{1}{\omega C_b - 1/X_{in}} \qquad (2)$$

Next, the signal source Vs 21 is ignored, and Vrcv,d is analyzed. An admittance Y as seen from Vdrv 26 and Zdrv 25 is represented by the following expression.

[Expression 3]

$$Y = j\omega C_b + \frac{1}{jX_{in}} + \frac{1}{jX_v + 1/j\omega C_g + R_s} \qquad (3)$$

$$= j\left\{\omega C_b - \frac{1}{X_{in}} + \frac{\omega C_g}{1 - \omega C_g X_v + j\omega C_g R_s}\right\}$$

When no resonance occurs on the transmission side and 1>>ωCgXv is achieved, Cg 18 is very small and 1>>ωCgRs is also achieved, and hence a third term in Expression (3) can be ignored. When the resonance occurs on the transmission side and Expression (2) is satisfied, the admittance Y can be represented as follows.

[Expression 4]

$$Y = j\left\{\omega C_b - \frac{1}{X_{in}} + \frac{\omega C_g}{1 - \omega C_g\left[\frac{1}{\omega C_g} + \frac{1}{\omega C_b - 1/X_{in}}\right] + j\omega C_g R_s}\right\} \qquad (4)$$

$$= j\left[\omega C_b - \frac{1}{X_{in}}\right]\frac{-j\omega C_b R_s - R_s/jX_{in}}{1 - j\omega C_b R_s - R_s/jX_{in}}$$

In Expression 4, ωCb−1/Xin is substantially equivalent to an admittance when no resonance occurs. Therefore, the admittance varies depending on a case where the resonance occurs and a case where no resonance occurs, and its rate of change corresponds to a part excluding j(ωCb−1/Xin) in Expression (4). It is possible to configure a structure of receiving the data only when the transmitter 2 of the human body 3 that is in contact with the reception electrode 12 resonates by monitoring this change.

In the block diagram of FIG. 2, the detecting section 9 monitors a change in a voltage amplitude applied to the input reactance section 4 from the detection signal source 10 when the admittance Y changes, and a data output start signal used to output the data is output to a data output section upon receiving the voltage amplitude when the resonance occurs. The demodulating section 8 outputs the data only when the data output start signal that is used to output the data from the detecting section 9 is input, and does not output the data in any other case.

In FIG. 2, although the input reactance section 4 is provided to facilitate analysis, the input reactance section 4 may be eliminated and an input impedance of the pre-amplifying section 6 may be used instead. At this time, it is preferable to use an input impedance having a reactance component larger than a resistance component.

Moreover, the admittance Y also changes depending on a case where the human body 3 comes into contact with the reception electrode 12 and a case where no contact is achieved. In order to moderate a change in the admittance Y in this example, it is desirable to set Xin 24 to be smaller than an impedance of the stray capacitance Cb 19 between the human body 3 and the earth ground 20.

A detection signal source output impedance 5 prevents a received signal from entering the detection signal source 10, and it is preferable that this impedance is not very large so that an impedance between the reception electrode 12 and the earth ground 20 is not affected. Furthermore, the detection signal source output impedance 5 may be eliminated, and an output impedance of the detection signal source 10 itself may be increased.

Although the resonance on the transmission side is monitored to start/stop outputting the data in the above structure, demodulation of the data may be started/stopped by turning on/off a power supply of the demodulating section 8 which is not required for monitoring the resonance. In this case, a power consumption of the receiver 1 can be reduced.

Figure 5:
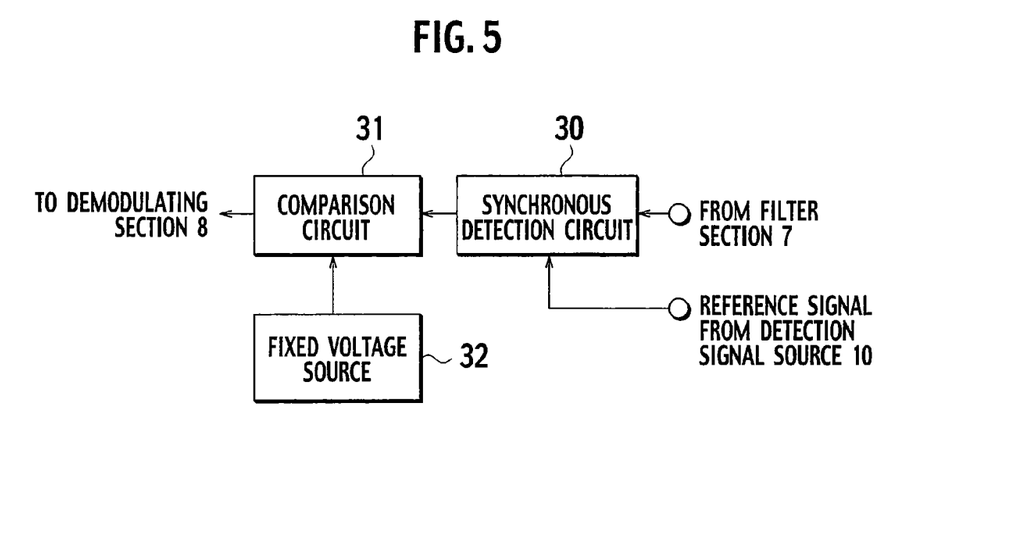
FIG. 5 shows an example of a structure of a detection circuit according to the first embodiment.

FIG. 5 shows a structural example of the detecting section 9. In this structural example, a signal that is in phase with the detection signal source 10 alone is monitored based on synchronous detection. A threshold value that is supplied to a comparison circuit 31 by a fixed voltage source 32 is previously set to a voltage amplitude value when the resonance occurs, and a data output start signal is output to the demodulating section 8 when the voltage amplitude value monitored by a synchronous detection circuit 30 exceeds the threshold value.

Based on the above structure, the data can be received and output only when the resonance with the transmitter 2 that induces an electric field based on information to be received occurs, the transmitter 2 being brought by the human body 3 that is in close proximity to the reception electrode 12. Since the data from a parasitic communication path from a radiation source or a transmitter distant from the reception electrode 12 can be blocked, this embodiment can provide communication with high isolation.

Although a setting of a variable reactance section 16 in the transmitter 2 has not been explained in this embodiment, a reactance value of the variable reactance section 16 is set to a value enabling occurrence of the resonance or a close value when a packet including the data is output and it is set to a value enabling occurrence of no resonance in any other case, thereby realizing communication with higher isolation.

Figure 6:
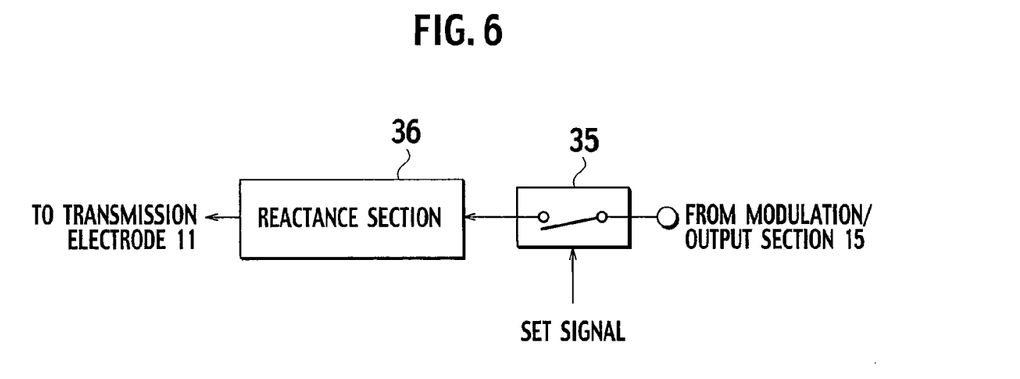
FIG. 6 shows an example of a structure of a variable reactance according to the first embodiment.

FIG. 6 shows a structural example of the variable reactance section 16. A reactance value of the reactance section 36 is fixed, and it is set to a value enabling occurrence of the resonance when a switch 35 is closed. In this structure, a resonant state occurs between the transmitter 2 and the stray capacitance when a set signal is input and the switch 35 is closed, and no resonance occurs when the switch 35 is opened. The switch 35 is closed when a packet is output, and the switch 35 is opened when a packet is not output, thereby providing the communication with high isolation.

Although the reactance section 36 having a fixed value is used in this structural example, a self-regulating variable reactance section constituted of an inductor, a variable capacitance diode, and a resistor may be used. In the self-regulating variable reactance section, when direct-current electricity generated due to rectification characteristics of the diode flows through the resistor, a bias voltage is generated in the variable capacitance diode. Therefore, just inputting an alternating-current signal allows a reactance value to be changed to a value close to the resonant state.

Moreover, although a reactance value is equivalently changed by the switch 35, a variable reactance section that changes a reactance value by using a voltage value from the outside may be used. In this case, a continuously changing set signal is used, and the reactance value is set based on a value of this set signal. Additionally, in case of adjusting the reactance value to a value enabling occurrence of the resonance based on automatic control, adjustment is carried out when a packet is output, and the reactance value is deviated from an optimum value when a packet is not output. When the transmitter having the above function is applied to a communication system having the structure depicted in FIG. 2, the communication system having higher isolation can be provided.

Second Embodiment

Figure 7:
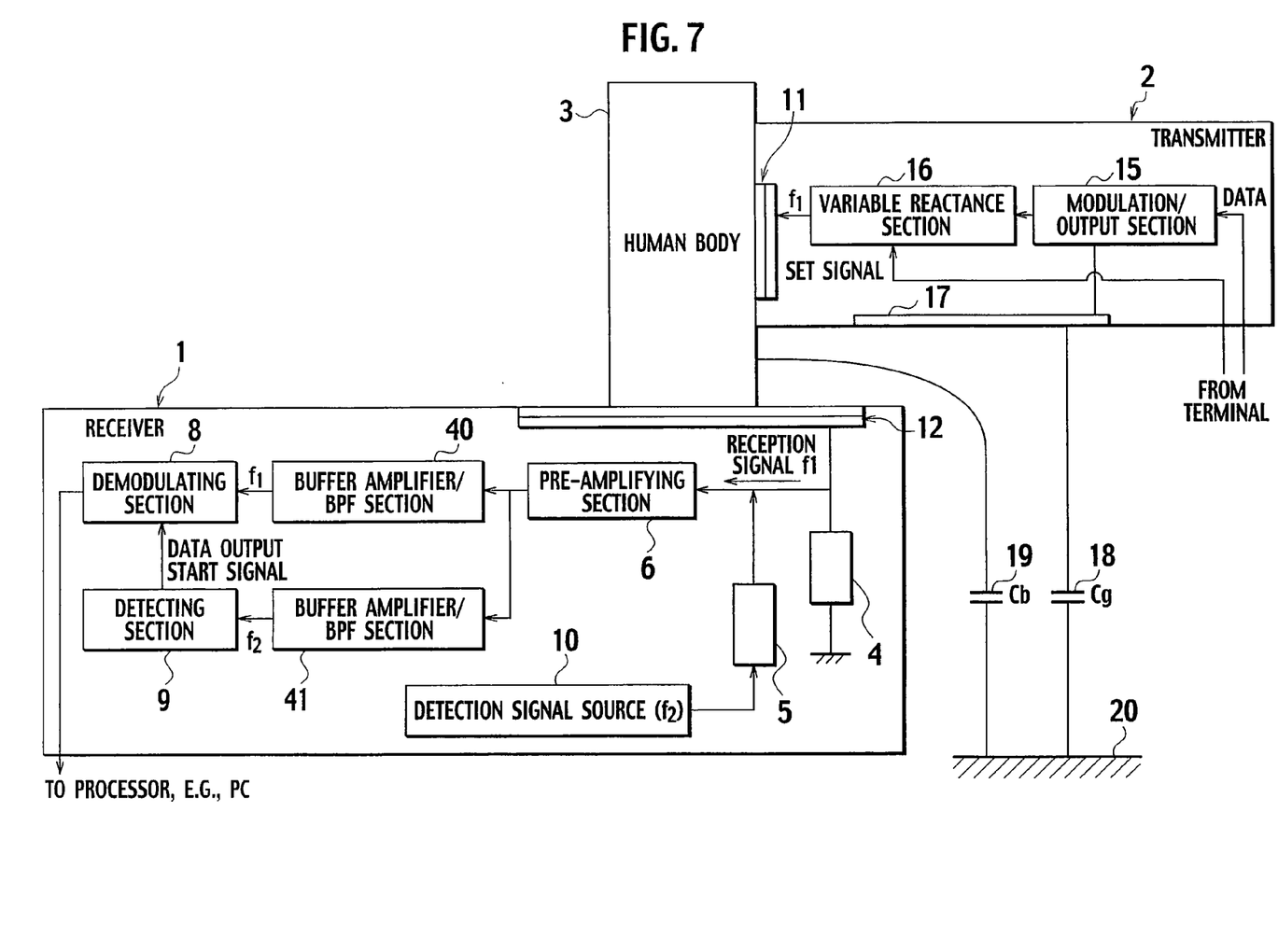
FIG. 7 shows a block diagram for explaining a basic structure according to a second embodiment.

FIG. 7 shows a block diagram of a second embodiment. Although a frequency in communication is equal to a frequency of a detection signal in the first embodiment, a signal having a frequency different from that of a communication signal is used as a detection signal in this embodiment. A received signal f1 is amplified by a pre-amplifying section 6, and then input to a demodulating section 8 through a buffer amplifier/BPF section 40 to be demodulated into data. A signal f2 output from a detection signal source 10 is amplified by the pre-amplifying section 6, and then input to a detecting section 9 through a buffer amplifier/BPF section 41.

An admittance Y in this example will be considered. Assuming that respective frequencies of communication and a detection signal are $\omega c$ and $\omega s = \omega c + \Delta \omega$, the admittance can be presented by the following expression based on Expression (3).

[Expression 5]

$$Y = j\omega_s C_b + \frac{1}{jX_{in}(\omega_s)} + \frac{1}{jX_v(\omega_s) + 1/j\omega_s C_g + R_s} \quad (5)$$

A reactance $Xv,c = Xv(\omega c)$ when resonance occurs on the transmission side can be represented by the following expression.

[Expression 6]

$$X_{v,c} = \frac{1}{\omega_c C_g} + \frac{1}{\omega_c C_b - 1/X_{in,c}} \quad (6)$$

In Expression (6), $Xin,c = Xin(\omega c)$ is determined. The following relational expression can be achieved with respect to $Xv(\omega s)$ and $Xv,c$, and $Xin(\omega s)$ and $Xin,c$.

$$Xv(\omega s) = Xv,c + \Delta\omega Xv'(\omega c) \quad (7)$$

$$1/Xin(\omega s) = 1/Xin,c - \Delta\omega Xin'(\omega c)/Xin,c2 \quad (8)$$

$Xv'(\omega)$ and $Xin'(\omega)$ represent first order derivatives of $Xv(\omega)$ and $Xin(\omega)$, respectively. When Expression (7) and Expression (8) are assigned to Expression (5) to be collected up, the following expression can be obtained.

[Expression 7]

$$Y = j\omega_c C_b + \frac{1}{jX_{in,c}} + \frac{1}{jX_v(\omega_c) + j\Delta\omega X_v'(\omega_c) + 1/j\omega_s C_g + R_s} + \quad (9)$$

$$j\Delta\omega C_b + j\frac{\Delta\omega X_{in}'(\omega_c)}{X_{in,c}^2}$$

When Expression (6) is assigned to the above expression, an admittance when the resonance occurs can be obtained.

[Expression 8]

$$Y = j\left[\omega_c C_b - \frac{1}{X_{in,c}}\right] \frac{-\left\{\begin{array}{c} jR_s - \Delta\omega X_v'(\omega_c) - \\ \frac{\Delta\omega}{\omega_c}\frac{1}{\omega_s C_g} \end{array}\right\}\left[\omega_c C_b - \frac{1}{X_{in,c}}\right]}{1 - \left\{\begin{array}{c} jR_s - \Delta\omega X_v'(\omega_c) - \\ \frac{\Delta\omega}{\omega_c}\frac{1}{\omega_s C_g} \end{array}\right\}\left[\omega_c C_b - \frac{1}{X_{in,c}}\right]} + \quad (10)$$

$$j\Delta\omega C_b + j\frac{\Delta\omega X_{in}'(\omega_c)}{X_{inc,}^2}$$

Based on Expression (9) and Expression (10), it can be understood that occurrence of the resonance on the transmission side can be likewise detected from a change in the admittance in this structure. In particular, it is assumed that the following Expression (11) is achieved.

[Expression 9]

$$1 + \left\{\Delta\omega X'_v(\omega_c) + \frac{\Delta\omega}{\omega_c}\frac{1}{\omega_s C_g}\right\}\left[\omega_c C_b - \frac{1}{X_{in,c}}\right] = 0 \quad (11)$$

At this time, Expression (10) can be represented by the following expression.

[Expression 10]

$$Y = j\left[\omega_c C_b - \frac{1}{X_{in,c}}\right] + \frac{1}{R_s} + j\Delta\omega C_b + j\frac{\Delta\omega X'_{in}(\omega_c)}{X_{in,c}^2} \quad (12)$$

In this case, when the resonance occurs on the transmission side, the admittance Y becomes larger than that in a case where no resonance occurs. When a signal having a frequency different from that of communication is used as a detection signal, a sign of a change in the admittance Y can be varied based on how to select a parameter depending on a case where the resonance occurs and a case where no resonance occurs.

When the resonance occurs on the transmission side, a voltage amplitude that is input to the detecting section 9 varies with a change in the admittance Y, and a data output start signal is output to the demodulating section 8. Detection in this embodiment does not have to be synchronous detection in the first embodiment. The demodulating section 8 outputs the data when the data output start signal is input, and does not output the data in any other case. In this structure, the data can be received and output only when the resonance occurs in the transmitter 2, thereby providing a communication system with high isolation that can block the data from a parasitic communication path.

In this embodiment, communication with higher isolation can be realized by setting a reactance value of a variable reactance to a value enabling occurrence of the resonance or a close value when a packet including the data is output, and to a value enabling no occurrence of the resonance in any other case.

Further, the variable reactance section depicted in FIG. 6 or a variable reactance section that changes a reactance value based on a voltage value from the outside may be used. In case of adjusting to a reactance value enabling occurrence of the resonance based on automatic control, adjustment is carried out when outputting a packet, and the reactance value is deviated from an optimum value when outputting no packet.

Although a voltage applied to the input reactance section 4 is input to the detecting section 9 in FIG. 7, a potential difference between both ends of the detection signal source output impedance 5 may be input. Furthermore, turning on/off a power supply of the demodulating section 8 that is not required in monitoring the resonance may be performed.

Modification of Third Embodiment

Figure 8:
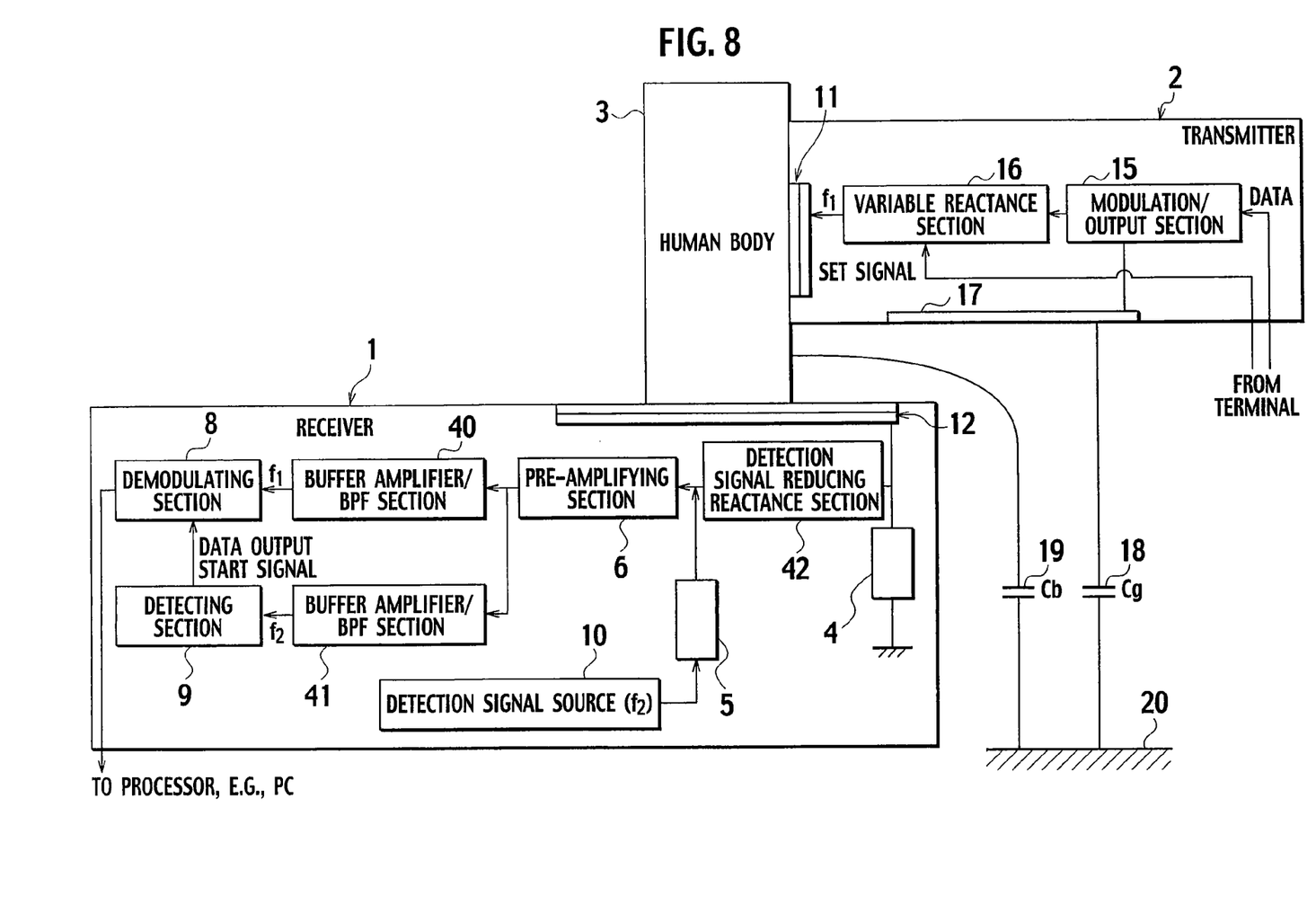
FIG. 8 shows a block diagram for explaining a basic structure according to a third embodiment.

FIG. 8 shows a block diagram of a third embodiment, and a detection signal reducing reactance section 42 is interposed between a reception electrode 12 and a pre-amplifier 6. When a reactance value of the detection signal reducing reactance section 42 is set to a value enabling series resonance with an admittance represented by Expression (10) at a frequency fs=ωs/2π, an amplitude of a detection signal having a frequency fs that is input to the pre-amplifying section 6 is reduced in a case where the resonance occurs on a transmission side.

A detection signal obstructs demodulation when Δω is small and removal of the detection signal is not sufficient in a buffer amplifier/BPF section 40, but reducing the detection signal that is input to the pre-amplifying section 6 enables normally performing demodulation of the data when the resonance occurs on the transmission side in the structure depicted in FIG. 8. It is to be noted that an input impedance for the pre-amplifier 6 is not used as Xin in this embodiment, and an input reactance section 4 is connected between a ground of a receiver 1 and a reception electrode 12.

Furthermore, although different frequencies are used for communication and a detection signal in this structure, the same frequency may be used when using the detection signal reducing reactance section 42 since an amplitude of the detection signal that is input to the pre-amplifying section 6 is reduced at the time of occurrence of the resonance on the transmission side.

Fourth Embodiment

Figure 9:
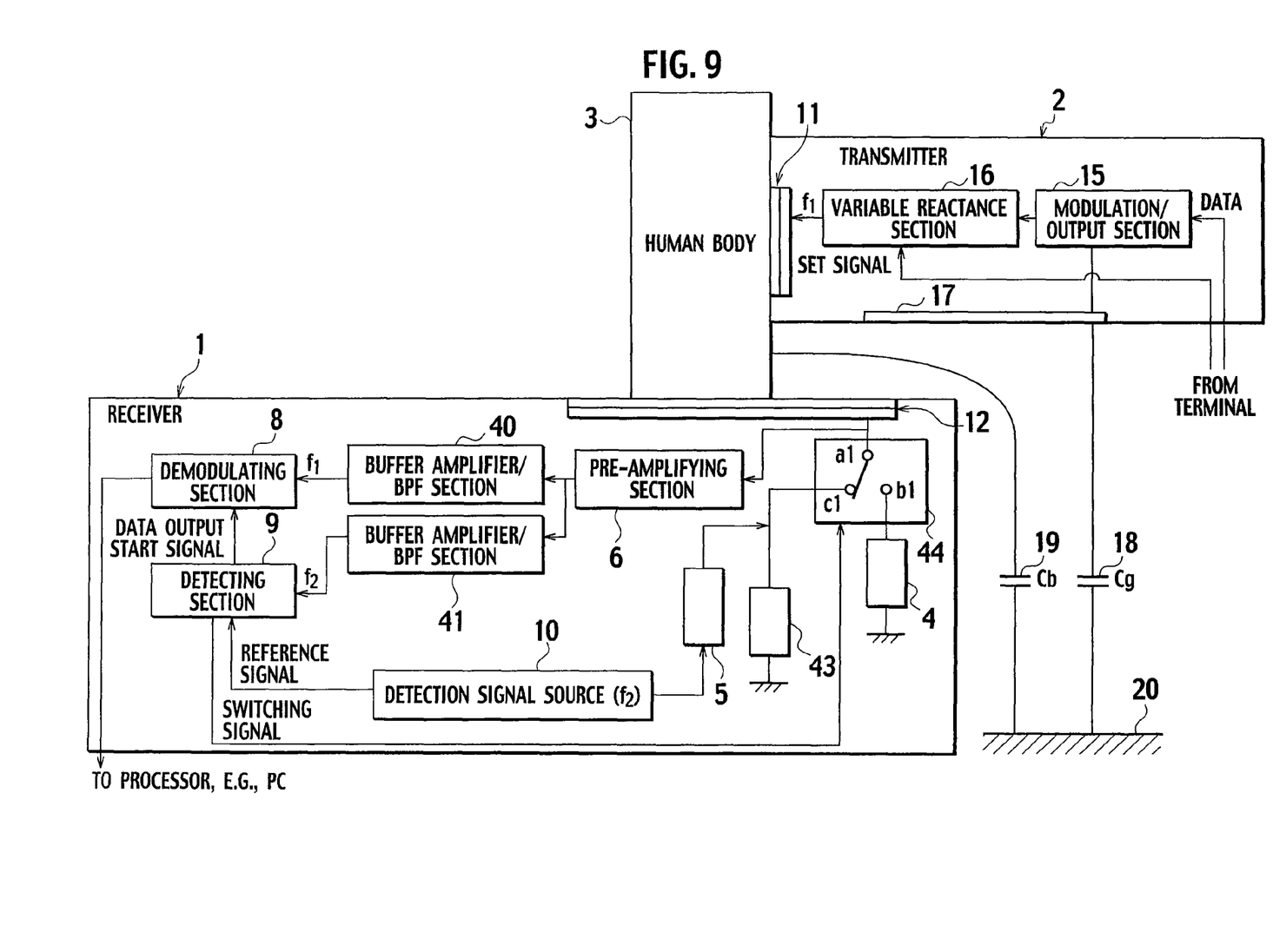
FIG. 9 shows a block diagram for explaining a basic structure according to a fourth embodiment.

FIG. 9 shows a block diagram for explaining a fourth embodiment.

In order to prevent an error from occurring in reception data due to radiation noise at the time of reception, reducing an input reactance is desirable, but detection becomes difficult when an input reactance is too low in case of detecting a resonant state on a transmission side before data reception.

In order to avoid this problem, an input reactance in a reception state for receiving data and an input reactance in a detection state for detecting a resonant state are separately provided. In FIG. 9, an input reactance section 4 is the input reactance in the reception state, and an input reactance section 43 is the input reactance in the detection state. At the time of effecting no communication or at the beginning of communication, a receiver 1 is in the detection state, and a1 and c1 are connected with each other in a switch 44 (shown in FIG. 9). When resonance occurs on the transmission side and a detecting section 9 detects this state, a data output start signal is output to a demodulating section 8, and a1 is connected with b1 in the switch 44 by using a switching signal.

As means for returning to the detection state, there are a method of providing a timer in the detecting section 9 and changing the switching signal after a predetermined period to return to the detection state and a method of providing a carrier wave detection circuit or a data detection circuit in the demodulating section 8 and changing the switching signal to return to the detection state when a carrier wave or the data is no longer detected, and both these methods can be used (not shown).

In this fourth embodiment, a reactance value of a variable reactance is set to a value enabling occurrence of the resonance or a close value when a packet including the data is output like the first to third embodiments, and it is set to a value enabling occurrence of no resonance in any other case, thereby realizing communication with further high isolation.

Moreover, the reactance section 36 depicted in FIG. 6 or a variable reactance section that changes a reactance value based on a voltage value from the outside may be used. In case of adjusting to a reactance value enabling occurrence of the resonance based on automatic control, adjustment is carried out when outputting a packet, and a reactance value is deviated from an optimum value when outputting no packet.

Figure 10:
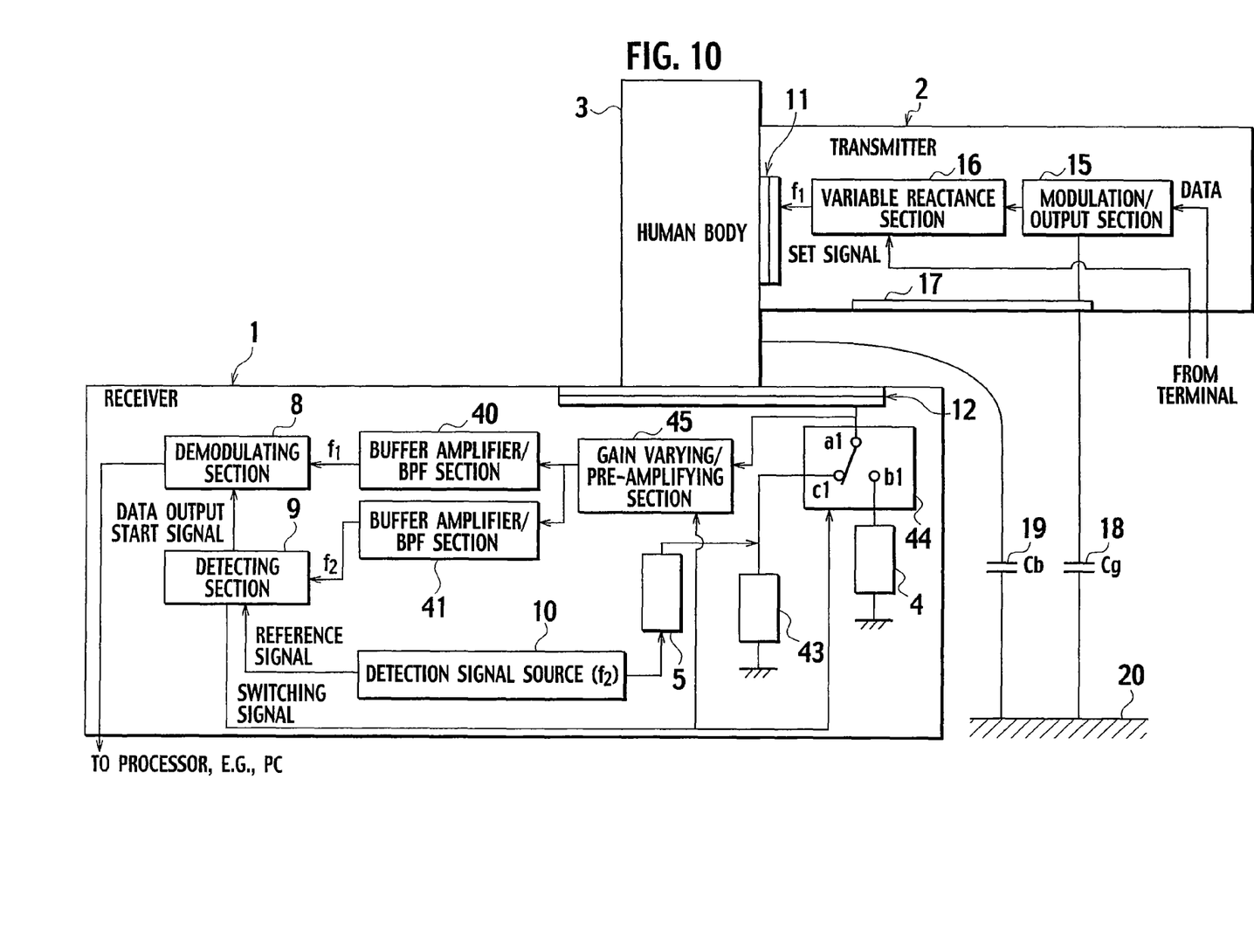
FIG. 10 shows a block diagram for explaining a modification according to the fourth embodiment.

Additionally, when an optimum gain of a pre-amplifying section 6 differs depending on the reception state and the detection state, a gain varying/pre-amplifying section 45 that can switch gains is used. FIG. 10 shows a block diagram in this case.

In order to improve a reception sensitivity, adopting a structure where the reception state in which the amplifier with low noise and a high gain is required can be switched to/from the detection state in which the amplifier having relatively high noise and a low power consumption can reduce the power consumption when receiving no data.

Figure 11:
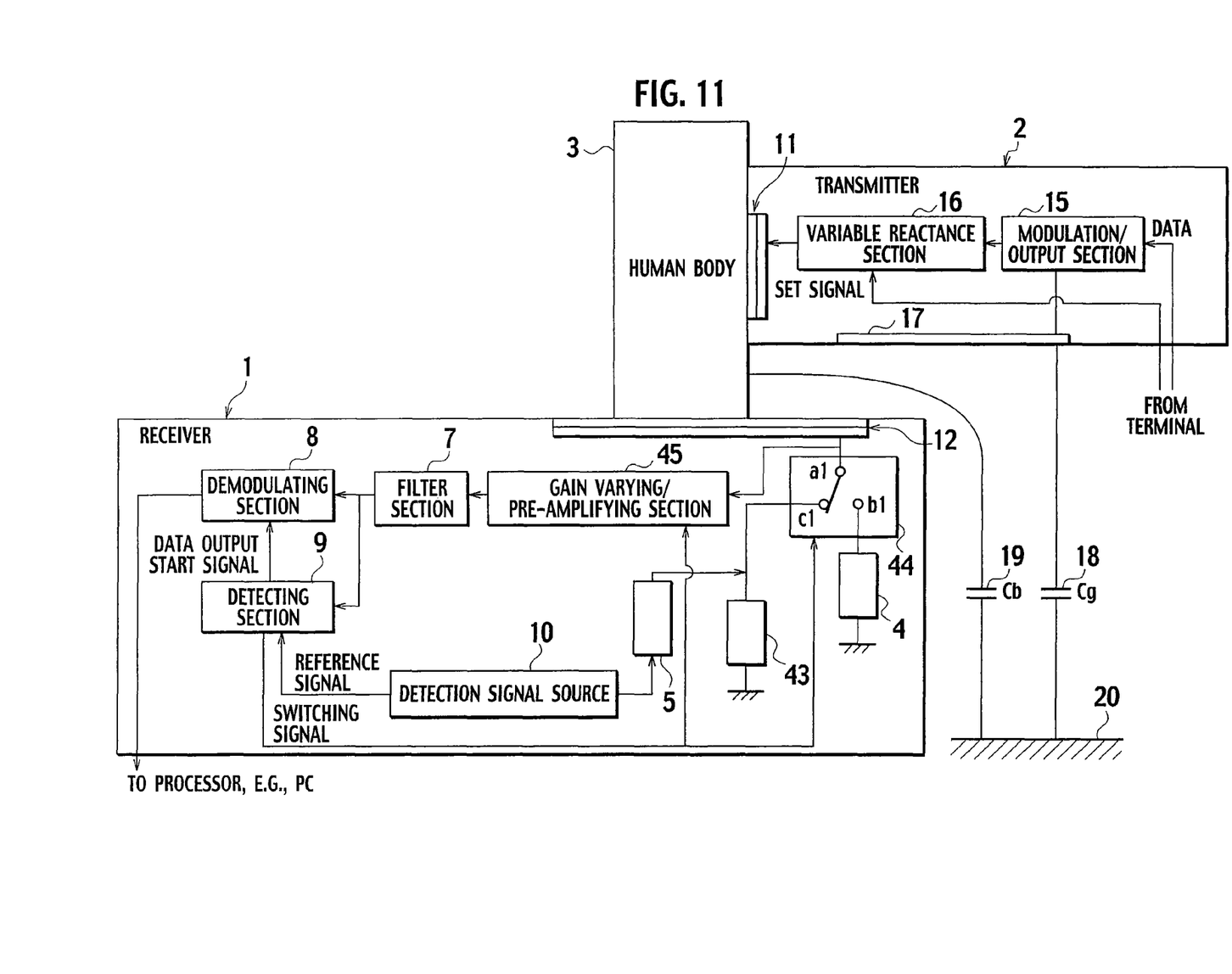
FIG. 11 shows a block diagram for explaining another modification according to the fourth embodiment.

It is to be noted that a frequency of the detection signal is different from that of communication in FIG. 10, but the same frequency may be used. FIG. 11 shows a block diagram in this case.

Fifth Embodiment

The transmitter alone is used in the portable terminal and the receiver alone is used in the installed type device in the first to fourth embodiments, but a transceiver having a transmission/reception function may be used to perform two-way communication.

Figure 12:
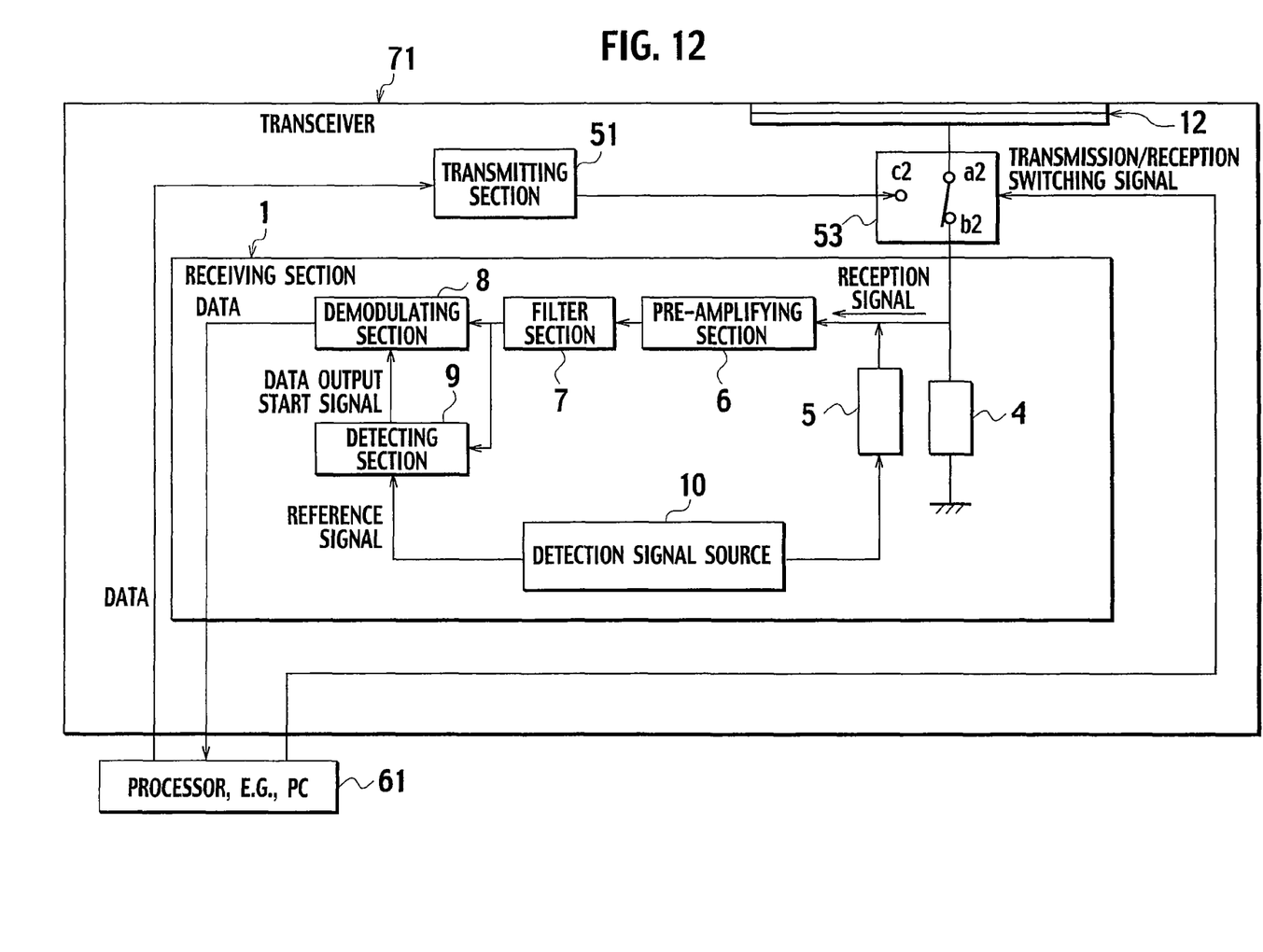
FIG. 12 shows a block diagram for explaining a basic structure according to a fifth embodiment.

FIG. 12 shows a structural view of a transceiver according to a fifth embodiment. In this drawing, switching between transmission and reception is carried out by changing over a transmission/reception changeover switch 53 based on a transmission/reception switching signal. At the time of reception, a2 is connected with b2, thereby connecting an electrode 12 with a transmitting section 51. On the other hand, at the time of transmission, a2 is connected with c2 to connect the electrode 12 with a transmitting section 51. According to this transmission/reception changeover switch 53, a reception signal can be prevented from leaking to the transmitting section 51 at the time of reception.

It is to be noted that the receiving section explained in the first embodiment is adopted as a receiving section in FIG. 5, but the receiving section described in the second to fourth embodiments may be adopted.

INDUSTRIAL APPLICABILITY

According to the present invention, adopting a mechanism that comes into contact with the reception electrode in the receiver and receives data only when the reactance section in the transmitter and a stray capacitance of the transmitter or a human body resonate enables providing the receiver, the transceiver, and the electric field communication system with high isolation that can block the data from a parasitic communication path.

The invention claimed is:

1. A receiver that receives an induced electric field from a transmitter or a transceiver which modulates information to be transmitted with an alternating-current signal having a predetermined frequency and includes a variable reactance section that produces resonance with a stray capacitance between a circuit ground of the transmitter or the transceiver that strays from an earth ground and the earth ground and an impedance between an electric field transmission medium and the earth ground, in an electric field communication system that induces an electric field based on the information to be transmitted in the electric field transmission medium, and uses the induced electric field to transmit the information and that, on the other hand, receives the electric field induced in the electric field transmission medium based on the information to be received, thereby performing communication, the receiver comprising:

an electrode that transmits/receives the electric field to/from the electric field transmission medium;

a detection signal source that applies a detection signal to the electrode; and a detecting section that detects the detection signal, further detects, based on an amplitude of the detection signal, a resonant state of the variable reactance section of the transmitter or the transceiver held by the electric field transmission medium near the electrode, an impedance between the electric field transmission medium and the earth ground, and the stray capacitance between the ground of the transmitter or the transceiver and the earth ground, and outputs a signal when the resonant state is present.

2. The receiver according to claim 1, further comprising a demodulating section that demodulates a signal output from a filter section that reduces a signal having a frequency other than a predetermined frequency to output the information in a case where a signal is output from the detecting section, and stops processing in another case.

3. A receiver that receives an induced electric field from a transmitter or a transceiver which modulates information to be transmitted with an alternating-current signal having a predetermined frequency and includes a variable reactance section that produces resonance with a stray capacitance between a circuit ground of the transmitter or the transceiver that strays from an earth ground and the earth ground and an impedance between an electric field transmission medium and the earth ground, in an electric field communication system that induces an electric field based on the information to be transmitted in the electric field transmission medium, and uses the induced electric field to transmit the information and that, on the other hand, receives the electric field induced in the electric field transmission medium based on the information to be received, thereby performing communication, the receiver comprising:

an electrode that transmits/receives the electric field to/from the electric field transmission medium;

a detection signal source that applies to the electrode a detection signal having a frequency different from that of an alternating-current signal from the transmitter or the transceiver; and a detecting section that detects the detection signal, further detects, based on an amplitude of the detection signal, a resonant state of the variable reactance section of the transmitter or the transceiver held by the electric field transmission medium near the electrode, an impedance between the electric field transmission medium and the earth ground, and the stray capacitance between the ground of the transmitter or the transceiver and the earth ground, and outputs a signal when the resonant state is present.

4. The receiver according to claim 3, further comprising a demodulating section that demodulates a signal output from a filter section that allows the passage of a signal having a frequency of an alternating-current signal from the transmitter or the transceiver to output the information in a case where a signal is output from the detecting section, and stops processing in another case.

5. The receiver according to claim 3, further comprising between the electrode and the filter section a detection signal reducing reactance section that produces series resonance with the impedance between the electrode and the earth ground at a frequency of the detection signal output from the detection signal source, when the variable reactance section, the impedance between the electric field transmission medium and the earth ground, and the stray capacitance between the ground in the transmitter or the transceiver and the earth ground are in the resonant state.

6. The receiver according to claim 1, further comprising:
a first input reactance section that is used in a reception state where an electric field based on the information to be received is received;
a second input reactance section that is used in a detection state where the resonant state is detected; and
an input reactance switching section that switches the first input reactance section and the second input reactance section to be connected between the electrode and the ground of the receiver in accordance with a signal output from the detecting section.

7. The receiver according to claim 2, further comprising a gain varying/amplifying section that changes a gain in accordance with a signal output from the detecting section at a front stage of the filter section.

8. A transceiver comprising:
a receiver according to claim 1;
a transmitter that transmits an electric field based on information to be transmitted to the electrode; and
a transmission/reception switching section that switches the receiver and the transmitter to be connected with the electrode in accordance with a switching signal.

9. An electric field communication system that induces an electric field based on information to be transmitted in an electric field transmission medium, transmits the information by using the induced electric field and, on the other hand, receives an electric field induced in the electric field transmission medium based on the information to be received, thereby performing communication, the electric field communication system comprising:
a transmitter which includes a modulation/output section that modulates the information to be transmitted with an alternating-current signal having a predetermined frequency and outputs the modulated information; a transmission electrode that induces the electric field based on the information to be transmitted; and a variable reactance section that produces resonance with an impedance between the electric field transmission medium close to the transmission electrode and an earth ground and a stray capacitance between a ground of the modulation/output section and the earth ground when inducing the electric field, and does not produce the resonance when inducing no electric field; and
a receiver according to claim 1.

10. The electric field communication system according to claim 9, wherein a reactance value of the variable reactance section varies depending on a case where the electric field is induced and a case where no electric field is induced.

11. The receiver according to claim 6, further comprising a gain varying/amplifying section that changes a gain in accordance with a signal output from the detecting section at a front stage of the filter section.

12. The receiver according to claim 4, further comprising a gain varying/amplifying section that changes a gain in accordance with a signal output from the detecting section at a front stage of the filter section.

13. The receiver according to claim 5, further comprising a gain varying/amplifying section that changes a gain in accordance with a signal output from the detecting section at a front stage of the filter section.

14. The receiver according to claim 3, further comprising:
a first input reactance section that is used in a reception state where an electric field based on the information to be received is received;
a second input reactance section that is used in a detection state where the resonant state is detected; and
an input reactance switching section that switches the first input reactance section and the second input reactance section to be connected between the electrode and the ground of the receiver in accordance with a signal output from the detecting section.

15. The receiver according to claim 14, further comprising a gain varying/amplifying section that changes a gain in accordance with a signal output from the detecting section at a front stage of the filter section.

16. An electric field communication system that induces an electric field based on information to be transmitted in an electric field transmission medium transmits the information by using the induced electric field and, on the other hand, receives an electric field induced in the electric field transmission medium based on the information to be received, thereby performing communication, the electric field communication system comprising:
a transmitter which includes a modulation/output section that modulates the information to be transmitted with an alternating-current signal having a predetermined frequency and outputs the modulated information; a transmission electrode that induces the electric field based on the information to be transmitted; and a variable reactance section that produces resonance with an impedance between the electric field transmission medium close to the transmission electrode and an earth ground and a stray capacitance between a ground of the modulation/output section and the earth ground when inducing the electric field, and does not produce the resonance when inducing no electric field; and
a transceiver according to claim 8.

17. The electric field communication system according to claim 16, wherein a reactance value of the variable reactance section varies depending on a case where the electric field is induced and a case where no electric field is induced.

18. A transceiver comprising:
a receiver according to claim 3;
a transmitter that transmits an electric field based on information to be transmitted to the electrode; and
a transmission/reception switching section that switches the receiver and the transmitter to be connected with the electrode in accordance with a switching signal.

19. An electric field communication system that induces an electric field based on information to be transmitted in an electric field transmission medium transmits the information by using the induced electric field and, on the other hand, receives an electric field induced in the electric field transmission medium based on the information to be received, thereby performing communication, the electric field communication system comprising:
a transmitter which includes a modulation/output section that modulates the information to be transmitted with an alternating-current signal having a predetermined frequency and outputs the modulated information; a transmission electrode that induces the electric field based on the information to be transmitted; and a variable reactance section that produces resonance with an impedance between the electric field transmission medium close to the transmission electrode and an earth ground and a stray capacitance between a ground of the modulation/output section and the earth ground when inducing the electric field, and does not produce the resonance when inducing no electric field; and
a transceiver according to claim 18.

20. The electric field communication system according to claim 19, wherein a reactance value of the variable reactance section varies depending on a case where the electric field is induced and a case where no electric field is induced.

21. An electric field communication system that induces an electric field based on information to be transmitted in an electric field transmission medium transmits the information by using the induced electric field and, on the other hand, receives an electric field induced in the electric field transmission medium based on the information to be received, thereby performing communication, the electric field communication system comprising:

a transmitter which includes a modulation/output section that modulates the information to be transmitted with an alternating-current signal having a predetermined frequency and outputs the modulated information; a transmission electrode that induces the electric field based on the information to be transmitted; and a variable reactance section that produces resonance with an impedance between the electric field transmission medium close to the transmission electrode and an earth ground and a stray capacitance between a ground of the modulation/output section and the earth ground when inducing the electric field, and does not produce the resonance when inducing no electric field; and a receiver according to claim 3.

22. The electric field communication system according to claim 21, wherein a reactance value of the variable reactance section varies depending on a case where the electric field is induced and a case where no electric field is induced.

* * * * *